(12) United States Patent
Olaiya et al.

(10) Patent No.: US 8,055,536 B1
(45) Date of Patent: Nov. 8, 2011

(54) AUTOMATED REAL-TIME SECURE USER DATA SOURCING

(75) Inventors: Oladipupo Olaiya, Raleigh, NC (US); Gregory Morgan Evans, Raleigh, NC (US); Thomas Roberts, Fuquay-Varina, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1021 days.

(21) Appl. No.: 11/689,256

(22) Filed: Mar. 21, 2007

(51) Int. Cl.
*G06Q 30/00* (2006.01)
(52) U.S. Cl. .......................... 705/14.1; 705/26.1; 705/37
(58) Field of Classification Search .................. 705/14.1, 705/26.1, 37
See application file for complete search history.

(56) References Cited

U.S. PATENT DOCUMENTS

| | | |
|---|---|---|
| 5,056,019 A | 10/1991 | Schultz et al. |
| 5,404,393 A | 4/1995 | Remillard |
| 5,636,346 A | 6/1997 | Saxe |
| 5,761,662 A | 6/1998 | Dasan |
| 5,794,210 A | 8/1998 | Goldhaber et al. |
| 5,924,080 A | 7/1999 | Johnson |
| 5,974,396 A | 10/1999 | Anderson et al. |
| 5,974,398 A | 10/1999 | Hanson et al. |
| 5,983,214 A | 11/1999 | Lang et al. |
| 5,995,943 A | 11/1999 | Bull et al. |
| 6,009,411 A | 12/1999 | Kepecs |
| 6,035,280 A | 3/2000 | Christensen |
| 6,112,186 A | 8/2000 | Bergh et al. |
| 6,125,352 A | 9/2000 | Franklin et al. |
| 6,134,532 A | 10/2000 | Lazaros et al. |
| 6,216,129 B1 | 4/2001 | Eldering |
| 6,298,348 B1 | 10/2001 | Eldering |
| 6,324,519 B1 | 11/2001 | Eldering |
| 6,327,574 B1 | 12/2001 | Kramer et al. |
| 6,363,481 B1 | 3/2002 | Hardjono |
| 6,394,341 B1 | 5/2002 | Mäkipää et al. |
| 6,430,539 B1 | 8/2002 | Lazarus et al. |
| 6,446,261 B1 | 9/2002 | Rosser |

(Continued)

FOREIGN PATENT DOCUMENTS

EP 1 162 840 A2 6/2001

(Continued)

OTHER PUBLICATIONS

No Author, "Advertisement Bidding System and Method," (article), date unknown, 20 pages, http://www.priorartdatabase.com/IPCOM/000138556.

(Continued)

*Primary Examiner* — Jagdish Patel
*Assistant Examiner* — Sara Chandler
(74) *Attorney, Agent, or Firm* — Withrow & Terranova, PLLC (57) ABSTRACT

Profiling data for a consumer can be generated from one or more of the consumer's own financial records. The profiling data can be provided by the consumer him or herself through use of one or more computing devices subject to terms, conditions, rules, and/or other parameters set by the consumer. The profiling data may be provided to one or more interested parties in exchange for value, with the exchange negotiated by one or more software agents acting on behalf of the consumer. The profiling data may be provided in a manner such that it is accessible only in a manner specified by the consumer. For instance, profiling data may be subject to digital rights management or other restrictions such that the receiving party or parties may only access the data for a limited time.

7 Claims, 5 Drawing Sheets

U.S. PATENT DOCUMENTS

| | | |
|---|---|---|
| 6,519,571 B1 | 2/2003 | Guheen et al. |
| 6,718,551 B1 | 4/2004 | Swix et al. |
| 6,820,204 B1 | 11/2004 | Desai et al. |
| 6,925,441 B1 | 8/2005 | Jones, III et al. |
| 6,941,376 B2 | 9/2005 | Mitchell et al. |
| 6,983,478 B1 | 1/2006 | Grauch et al. |
| 7,039,932 B2 | 5/2006 | Eldering |
| 7,062,510 B1 | 6/2006 | Eldering |
| 7,072,858 B1 | 7/2006 | Litzow et al. |
| 7,257,581 B1 | 8/2007 | Steele et al. |
| 7,565,450 B2 | 7/2009 | Garcia-Luna-Aceves et al. |
| 7,600,037 B2 | 10/2009 | Tucker |
| 7,650,617 B2 | 1/2010 | Hoshino et al. |
| 7,652,594 B2 | 1/2010 | Lamont et al. |
| 2001/0049620 A1 | 12/2001 | Blasko |
| 2001/0056577 A1 | 12/2001 | Gordon et al. |
| 2002/0002488 A1 | 1/2002 | Muyres et al. |
| 2002/0004744 A1 | 1/2002 | Muyres et al. |
| 2002/0019769 A1 | 2/2002 | Barritz et al. |
| 2002/0059094 A1 | 5/2002 | Hosea et al. |
| 2002/0073066 A1 | 6/2002 | Coutts et al. |
| 2002/0087402 A1 | 7/2002 | Zustak et al. |
| 2002/0092017 A1 | 7/2002 | Klosterman et al. |
| 2002/0095454 A1 | 7/2002 | Reed et al. |
| 2002/0116313 A1 | 8/2002 | Detering |
| 2002/0138291 A1 | 9/2002 | Vaidyanathan et al. |
| 2002/0138440 A1 | 9/2002 | Vaidyanathan et al. |
| 2002/0178447 A1 | 11/2002 | Plotnick et al. |
| 2002/0184403 A1 | 12/2002 | Dahlin et al. |
| 2002/0188589 A1 | 12/2002 | Salmenkaita et al. |
| 2003/0004793 A1 | 1/2003 | Feuer |
| 2003/0004898 A1 | 1/2003 | McAuliffe et al. |
| 2003/0023489 A1 | 1/2003 | McGuire et al. |
| 2003/0052916 A1 | 3/2003 | Stern |
| 2003/0067554 A1 | 4/2003 | Klarfeld et al. |
| 2003/0149975 A1 | 8/2003 | Eldering et al. |
| 2003/0204460 A1 | 10/2003 | Robinson et al. |
| 2004/0010470 A1 | 1/2004 | Mills |
| 2004/0073924 A1 | 4/2004 | Pendakur |
| 2004/0139025 A1 | 7/2004 | Coleman |
| 2004/0139315 A1 | 7/2004 | Tokutani et al. |
| 2005/0071252 A1 | 3/2005 | Henning et al. |
| 2005/0091160 A1 | 4/2005 | Kitze et al. |
| 2005/0097183 A1 | 5/2005 | Westrelin |
| 2005/0138658 A1 | 6/2005 | Bryan |
| 2005/0171832 A1 | 8/2005 | Hull et al. |
| 2005/0177385 A1 | 8/2005 | Hull et al. |
| 2005/0188402 A1 | 8/2005 | de Andrade et al. |
| 2006/0026067 A1 | 2/2006 | Nicholas et al. |
| 2006/0036490 A1 | 2/2006 | Sagalyn |
| 2006/0075057 A1 | 4/2006 | Gildea et al. |
| 2006/0095507 A1 | 5/2006 | Watson |
| 2006/0110552 A1 | 5/2006 | Ishida et al. |
| 2006/0111991 A1 | 5/2006 | Wilshinsky et al. |
| 2006/0123448 A1 | 6/2006 | Ma et al. |
| 2006/0179003 A1 | 8/2006 | Steele et al. |
| 2006/0212900 A1 | 9/2006 | Ismail et al. |
| 2006/0259359 A1 | 11/2006 | Gogel |
| 2006/0259408 A1 | 11/2006 | Levy et al. |
| 2006/0294555 A1 | 12/2006 | Xie |
| 2007/0061332 A1 | 3/2007 | Ramer et al. |
| 2007/0061333 A1 | 3/2007 | Ramer et al. |
| 2007/0088713 A1* | 4/2007 | Baxter et al. ............ 707/10 |
| 2007/0094042 A1* | 4/2007 | Ramer et al. ............ 705/1 |
| 2007/0130070 A1 | 6/2007 | Williams |
| 2007/0156697 A1* | 7/2007 | Tsarkova ............ 707/9 |
| 2007/0162377 A1 | 7/2007 | Williams |

FOREIGN PATENT DOCUMENTS

| | | |
|---|---|---|
| EP | 1 528 478 A1 | 11/2003 |
| EP | 1 524 602 A2 | 9/2004 |
| WO | WO 99/05584 A2 | 2/1999 |
| WO | WO 01/71524 A1 | 9/2001 |
| WO | WO 02/45430 A1 | 6/2002 |
| WO | WO 2004/080098 A1 | 9/2004 |
| WO | WO 2006/115911 A2 | 11/2006 |

OTHER PUBLICATIONS

James Gwertzman et al., "An Analysis of Geographical Push-Caching," (article), May 1995, pp. 51-55, in Proceedings of the 5th IEEE Workshop on Hot Topics in Operating Systems, Orcas Island, WA.

No Author, "Internet Cache Protocol—Wikipedia," (website), obtained Jun. 15, 2007, 2 pages, http://en.wikipedia.org/wiki/Internet_Cache_Protocol.

R. Recio et al., "A Remote Direct Memory Access Protocol Specification," (article), Sep. 8, 2006, 82 pages, Internet Draft, http://www.ietf.org/internet-drafts/draft-ietf-rddp-rdmap-07.txt.

No Author, "SnapStream:PC DVR and TV tuner software," (website), obtained Jun. 15, 2007, 1 page, http://www.snapstream.com.

No Author, "Squid cache—Wikipedia," (website), obtained Jun. 15, 2007, 3 pages, http://en.wikipedia.org/wiki/Squid_cache.

* cited by examiner

AUTOMATED REAL-TIME SECURE USER DATA SOURCING

FIELD OF THE INVENTION

The present invention relates generally to providing information about a user, such as financial data regarding a consumer, to one or more interested parties.

BACKGROUND OF THE INVENTION

Various efforts have been made or proposed to determine consumer preference and demographic information through tracking consumer behavior and/or inferring behavior by analyzing financial data such as transaction records. For example, companies such as credit-card issuers have analyzed their vast stores of purchase records of consumers in order to determine spending habits. As another example, merchants such as grocery stores offer discount cards which may be used by the merchant to track the cardholder's grocery buying habits. As another example, consumer behavior may be tracked by devices used by the consumer, such as set-top boxes that provide information about the consumer's television viewing habits and computer applications that provide information about the consumer's Internet viewing habits (e.g., sites visited, etc.).

However, such efforts may suffer from several types of drawbacks. For instance, consumers concerned about privacy may avoid the use of services that track their behavior and/or otherwise aggregate consumer data. Another possible drawback includes the accuracy of information. For instance, in an effort to alleviate privacy concerns, some proposed systems generate a "profile" of a consumer that does not include any raw information (such as purchase records). However, such a profile is (at least) a level of abstraction away from the actual consumer's behavior and may be inaccurate.

A need remains for methods and systems that provide information about a user, such as a consumer, in a manner that is accurate but also respects the consumer's privacy and other interests in the information.

SUMMARY OF THE INVENTION

Objects and advantages of the present invention will be apparent to one of skill in the art upon careful review of the specification and/or practice of the subject matter. Such objects and advantages include providing consumer data sourcing that is up-to-date and in a manner that ensures the consumer's wishes with regard to the privacy and use of the data are respected.

Embodiments of the present subject matter include computer-based methods and systems for providing consumer data, such as, for example, consumer financial data, to one or more interested parties that may use the data for, e.g., profiling the consumer. However, the data sourcing and distribution model is consumer-centric. The profiling data is generated from one or more of the consumer's own financial records, is provided by the consumer him or herself (through use of one or more computing devices), and is provided subject to terms, conditions, rules, and/or other parameters set by the consumer. Therefore, drawbacks to earlier profiling systems and methods related to accuracy of profiling data and/or privacy concerns may be advantageously reduced.

This specification refers to "consumer-managed data records." Use of the term is meant to refer to one or more collections of information about or under the control of the consumer. For example, consumer-managed financial records can comprise one or more collections of data items pertaining to the consumer's finances, including, for example, budgets, purchases of goods or services, and other transfers of value to and from the consumer. The specification also uses the term "consumer profiling data" to refer to data that is released by the consumer to one or more interested recipients. Although the recipients may use the data for consumer profiling, it is conceivable for the data to be used for other purposes as well, so it should be understood that "consumer profiling data" is used for purposes of convenience and not for purposes of limitation.

For example, a consumer may maintain a collection of financial records as part of an expense tracking and budgeting software application. The consumer may designate certain financial data items included in the record(s) for release to one or more potential recipients in exchange for value. For example, a service provider may offer a discount to consumers who provide certain information useful for targeting advertisements. One or more software agents acting on behalf of the consumer may negotiate an agreement or agreements with interested potential recipients for release of the data pursuant to the terms set forth by the consumer. If an acceptable agreement is reached, the data item(s) may be packaged into a suitable format for release to the recipient(s) in a manner that ensures the consumer's preferences with regard to the data cannot be ignored. For example, the financial data item(s) may be packaged using a digital rights management (DRM) scheme such that the data item(s) are accessible for a limited time only.

BRIEF DESCRIPTION OF THE SEVERAL VIEWS OF THE DRAWINGS

A full and enabling specification including the best mode of practicing the appended claims and directed to one of ordinary skill in the art is set forth more particularly in the remainder of the specification. The specification makes reference to the appended figures, in which:

Use of like reference numerals in different features is intended to illustrate like or analogous components.

DETAILED DESCRIPTION OF THE PREFERRED EMBODIMENTS

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the specification and claims. For instance, features illustrated or described as part of one embodiment may be used on another embodiment to yield a still further embodiment. Thus, it is intended that the present specification includes modifications and variations as come within the scope of the appended claims and their equivalents.

The technology discussed herein makes reference to servers, databases, software applications, and other computer-based systems, as well as actions taken by and information sent to and from such systems. One of ordinary skill in the art will recognize the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

When data is obtained or accessed between a first and second computer system or component thereof, the actual data may travel between the systems directly or indirectly. For example, if a first computer accesses a file or data from a second computer, the access may involve one or more intermediary computers, proxies, and the like. When file(s) or data are transferred between two computers, for instance, the actual file(s) or data may move between the computers, or one computer may provide a pointer or metafile that the other computer uses to access the actual data by going to one or more additional computers.

The present specification also makes reference to the relay of communicated data over a network such as the Internet. However, any suitable network or combination(s) of networks may be used. For instance, communications may occur over a dial-in network, a local area network (LAN), wide area network (WAN), public switched telephone network (PSTN), the Internet, intranet or other type(s) of networks. Networks may comprise any combination of hard-wired or wireless communication links.

The various computer systems discussed herein are not limited to any particular hardware architecture or configuration. Any suitable programming, scripting, or other type of language or combinations of languages may be used to implement the teachings contained herein. Embodiments of the methods and systems set forth herein may be implemented by one or more general-purpose or customized computing devices accessing software instructions rendered in a computer-readable form. Embodiments of the methods and systems set forth herein may also be implemented by hard-wired logic or other circuitry, including, but not limited to application-specific circuits. Of course, combinations of computer-executed software and hard-wired logic may be suitable, as well.

Embodiments of the methods disclosed herein may be executed by one or more suitable computing devices. Such devices may access one or more computer-readable media that embody computer-readable instructions which, when executed by at least one computer, cause the at least one computer to implement one or more embodiments of the methods disclosed herein. Furthermore, components of the presently-disclosed technology, such as knowledge bases and data stores, may be implemented using one or more computer-readable media.

Any suitable computer-readable medium or media may be used to implement or practice the presently-disclosed subject matter, including diskettes, drives, and other magnetic-based storage media, optical storage media, including disks (including CD-ROMS, DVD-ROMS, and variants thereof), flash, RAM, ROM, and other memory devices, and the like.

Software agents are utilized in some embodiments of the present subject matter. Generally speaking, any type of software agent may be used, with the actions of the software agent based on rules, parameters, profiles, and other data provided by the agent's principal or principals, i.e., the individual(s), group(s), or other entity (or entities) directing the agent's behavior. The degree of autonomy exercised by the agent may vary, and may depend on rules or preferences specified by the agent's principal. In some instances, the rules may provide for the agent to contact one or more persons and/or other agents for additional data, such as confirmation of a course of action or further information required by the agent to evaluate a situation. In other instances, the agent may act without the need for intervention by the principal(s). Agent functionality may be handled by single agents or coordinated amongst multiple agents. Agent(s) may reside in one computing device or may be distributed amongst multiple computing devices.

The present specification provides several examples of selecting and providing profiling data for use in targeted advertising. However, the principles discussed herein may be applicable to any other suitable situation in which information about a consumer's financial (and/or other) transactions may be desired.

A data sourcing system can comprise one or more computing devices adapted to provide data sourcing functionality. For instance, the device(s) may execute instructions embodied in one or more computer-readable media, which, when executed by the one or more computing devices, configure the device(s) to: interface with one or more outside sources, obtain data associated with a consumer, and maintain one or more data stores in a computer-readable medium associated with the consumer, with the data store comprising one or more consumer-managed data records. The instructions may further configure the device(s) to select at least one consumer-managed data record, choose at least one data item included in the selected record(s), and provide access to consumer profiling data that comprises the chosen data item or items. Generally speaking, selection of records, the choice of items, and providing access to the data can be based on one or more parameters specified by the consumer, such as distribution rules and restrictions. Access may be provided, for example, by assembling the item(s) into a rights-managed package and transmitting the package to one or more recipients. The consumer may define rules and conditions for the use of the data which may be enforced, for example, by way of digital rights management (DRM) schemes.

The computing devices can include any number or type of devices associated with a consumer, including, but not limited to a desktop, laptop, server, or portable computer, or other devices such as a television set-top box or cellular telephone. The data stores(s) may comprise one or more computer-readable media under the control of the consumer, such as files stored in a disk drive on a computer, a drive included in a networked appliance such as a television set-top box (STB), or even a portable storage device. In other embodiments, the data source(s) may comprise remote storage configured so that access to the consumer's data is under the control of the consumer. In some embodiments, the data records may comprise financial records maintained by the consumer that summarize the consumer's expenditures and budget. For example, the financial record(s) may include data source files for use with financial management software packages such as Quicken or Microsoft Money, with the consumer-managed records comprising consumer data obtained from the outside source(s).

As noted above, selecting records, choosing items, and providing access can be based on one or more parameters specified by the consumer. For instance, as will be discussed below, the consumer can designate certain items as non-releasable, with other items releasable subject to various conditions such as the party to which the information is to be transmitted. Additionally, the consumer may define rules or conditions for the release, such as a desired incentive that must be provided in exchange for the data item(s). In some embodiments, selecting and transmitting may be in response to a request received from one or more recipients of the data.

In some embodiments, the data sourcing functionality can include negotiating an exchange of one or more of the data items in return for one or more incentives from the recipient(s) of the items. As noted above, the exchange may be conducted subject to rules and preferences defined by the consumer whereby access to the information is not provided to a recipient unless the incentives (and other conditions, if applicable) meet those set forth by the consumer.

In some embodiments, negotiating can include conducting an auction of one or more data items on behalf of the consumer. A software agent acting on behalf of the consumer can receive and evaluate bids of incentives offered by one or more potential recipients in exchange for the one or more data items being auctioned by the consumer. The auction process can proceed subject to rules and restrictions specified by the consumer. In other embodiments, negotiating can include participating in an auction conducted on behalf of one or more potential recipients. For example, a software agent acting on behalf of the consumer can offer bids of data items to one or more recipients that are auctioning the opportunity to receive one or more incentives. The bidding and other aspects of participating proceed subject to rules and restrictions specified by the consumer.

As was noted above, in some embodiments, the data record(s) may comprise data associated with one or more financial management software applications. In some embodiments, the financial data items include at least one transaction record. In other embodiments, the financial data items include at least consumer-generated record, such as an item from the consumer's prior or projected budget. In some embodiments, the software that adapts the computing device(s) to select and provide access to consumer data is configured to interoperate with the financial management application(s), such as an application, module, or component that can be included in such applications and/or independently access the data stored by such application(s).

In some embodiments, the consumer profiling data can be assembled into one or more data packages such that recipient access to the data in the package is in accordance with the consumer's preferences. For example, the consumer may define rules that limit access to the provided data, such as prohibiting or limiting subsequent transfer of the data and/or providing for the data to expire at a given time. The data package may be assembled using any suitable manner that ensures that the consumer's rules, restrictions, or other parameters are followed. For instance, in some embodiments, the profiling data is assembled into a package that conforms to one or more digital rights management (DRM) schemes, with the consumer in the role of the rights holder.

A method of providing information about a consumer can include interfacing with at least one outside source and receiving data regarding a consumer. In some embodiments, the data can comprise financial data, and may come from sources such as bank and credit-card statements, purchase records, bills, and the like. However, data may be obtained from any suitable source(s) regardless of the type or format of data. The method can further comprise maintaining a data store using one or more computer-readable media associated with the consumer, and the data store can comprise one or more consumer-managed data records. The method can further include selecting at least one record and choosing one or more data items included in the selected record(s) and providing a recipient with access to consumer profiling data that includes the chosen data item(s). For instance, in some embodiments, based on the received data, at least one financial record can be stored in one or more computer-readable media associated with the consumer. Then, one or more of the consumer's financial records may be accessed, and one or more data items contained therein can be selected and included in consumer profiling data transmitted to at least one recipient. Selecting, choosing, and providing can be based on one or more parameters specified by the consumer.

In some embodiments, one or more of the steps comprising the method can be performed by a software agent (or agents) running on one or more computing devices associated with the consumer. Additionally, in some embodiments, the method can include receiving a request from the at least one recipient, with at least selecting, choosing, and providing being performed in response to the request.

Figure 1:
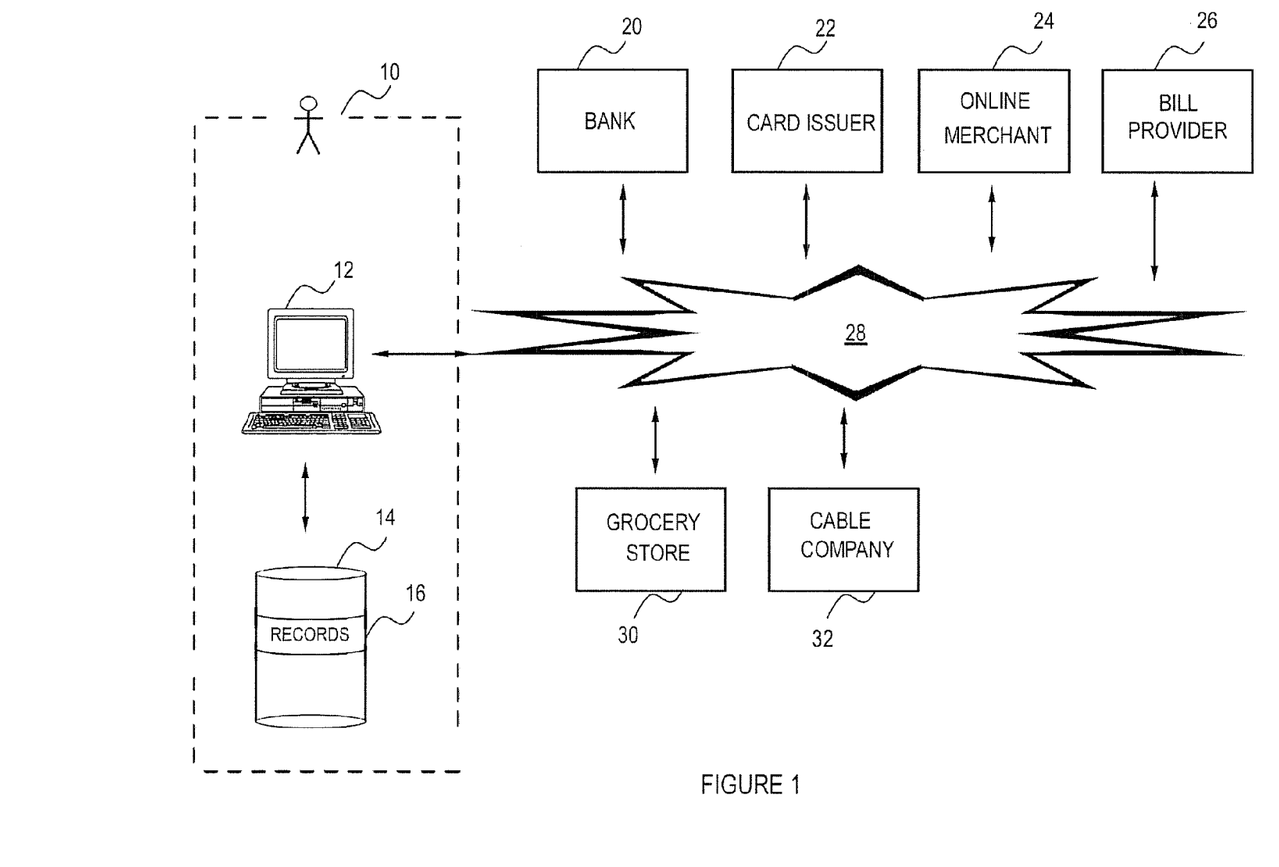
FIG. 1 is a diagram illustrating an exemplary group of sources of financial data, potential recipients of consumer information, and collection of financial records.

FIG. 1 is a diagram illustrating an exemplary group of sources of financial data, exemplary potential recipients of consumer information, and an exemplary collection of financial records. Specifically, FIG. 1 shows consumer 10, an associated consumer computing device 12, bank 20, card issuer 22, online merchant 24, bill provider 26, grocery store 30, and cable company 32, all of which are connected to one or more networks represented at 28, for example, the Internet. Although not shown in FIG. 1, the various parties may maintain other network connections to one another and/or other entities, as well. For example, bank 20 may maintain a private network connection to card issuer 22. FIG. 1 further shows exemplary data store 14 comprising one or more consumer-managed financial records 16.

The various entities shown in FIG. 1 may interact with consumer 10 in a variety of ways. For instance, consumer 10 may use an account maintained at bank 20 to purchase groceries from store 30 and to pay bills from cable company 32, card issuer 22, and bill provider 26. For example, card issuer 22 may comprise a company that has issued a credit card used by consumer 10 to purchase goods from online merchant 24. Bill provider 26 may comprise an entity such as a utility that bills consumer 10 for a service. Alternatively, bill provider 26 may comprise an aggregator of bills from different sources.

In any event, the various entities 20, 22, 24, 26, 30, and 32 each generate data regarding interactions with consumer 10. Consumer 10 may receive at least some of that data using any suitable computing device(s) 12, for example, to receive online bills, statements, and the like. For example, bank 20 may provide a monthly statement to consumer 10 as one or more structured documents. Similarly, bills from card issuer 22, bill provider 26, and cable company 32 may be sent as structured documents. Consumer 10 may use computing device 12 to access such bills.

Computing device 12 may represent a desktop, laptop, portable, server, or other computer. However, computing device 12 may represent any other type of computing device with access to store 14, such as a personal digital assistant (PDA), cellular telephone, a smart card, a home appliance, or a television set-top-box (STB). Computing device 12 may represent multiple devices working in combination to provide data sourcing functionality. For example, as discussed below, in some embodiments, consumer 10 may utilize a desktop, laptop, or other computer to maintain financial records while using a set-top box to define terms and conditions regarding release of certain portions of the financial records. Computing device(s) 12 may have direct access to store 14 and/or may access a copy of data from store 14 (or a subset thereof).

Various financial management software packages are available for consumers such as consumer 10 to manage their personal and/or business finances. For example, Quicken (available from Intuit, Inc. of Mountain View, Calif.) and Microsoft Money (available from Microsoft Corp. of Redmond, Wash.) represent examples of presently-popular financial software management applications. Some consumers may maintain financial records using one or more spreadsheet applications such as Microsoft Excel or open-source variants such as the Calc application available from http://www.openoffice.org. For instance, the consumer may use one or more applications to track income and expenditures and to produce various representations of past and projected spending and budgets. For example, a consumer 10 using a financial management application may download structured documents such as bank statements and use data from the statement to create or augment a running tally of income and expenditures. The data may be structured to include characterizations, such as spending categories. Alternatively or additionally, the consumer 10 may annotate various items for recordkeeping purchases.

For example, a bank statement may include entries for bank card transactions and checks. The bank card transactions may include annotations from the bank based on the identification of the merchant paid—for instance, the merchant may have a unique ID that is associated with an identifier. For example, if consumer 10 uses a bank card at the grocery store, the corresponding statement entries may indicate "grocery" as a category. However, if the consumer uses a check or cash, there may be no such entry. Additionally, the consumer may use different categorizations or the bank statement may not include categories. Therefore, the consumer may provide his own categorizations or other annotations as part of his financial recordkeeping. The records may contain any degree of granularity. For example, the consumer's credit card or other statements may be itemized by transactions from particular merchants in some embodiments. However, in some cases, the transaction records may be broken down to list individual purchases. As another example, lists of individual purchases may be provided to the consumer from a merchant or other entity that tracks such purchases, such as lists of items purchased from an online retailer or lists of items purchased and tracked as part of a loyalty program at a grocery or other store.

Data store 14 is meant to represent any suitable type or types of computer-readable media used to store the consumer-managed financial records. The type(s) and/or location(s) of store 14 are not essential to the present subject matter so long access to the consumer's data is at the discretion of consumer 10. For instance, data store 14 may comprise one or more disk drives connected to or otherwise accessible by computing device 12.

Data store 14 comprises consumer-managed financial records 16 in this example. Of course, data store 14 may comprise other consumer-managed records in addition to or instead of financial records in other embodiments. Consumer-managed financial records 16 may include copies of data provided by outside parties (e.g. bank 20, card issuer 22, and the like) as well as source files used by the consumer's financial management application(s). For example, consumer 10 may include Microsoft Money or Quicken data files on a local hard drive alongside copies of bank statements, credit card statements, and the like. However, consumer-managed financial records 16 may also include other financial data about the consumer that is not necessarily associated with a financial management application.

As another example, the consumer may maintain the data files on a remote host offering secure storage space. For instance, the consumer may rent storage space accessible over the internet from one or more providers. In some embodiments, the remote storage space may be associated with the consumer's financial management (and/or other) applications. For instance, the consumer's financial management application may provide for remote storage of financial data files and/or the application itself may be provided over the network (such as a web-based service). In some embodiments involving remote storage, although the information may be stored remotely by one or more storage providers, control remains in the consumer domain since the storage provider(s) may be prohibited from accessing and/or transferring the consumer's information. Instead, in some such embodiments, the information may only be accessible via the consumer's computing device(s). As a still further example, the consumer may maintain the data files on a portable storage device such as a flash memory key or portable hard drive. Security may be provided in any suitable manner. For instance, in the most basic form, security may be provided by physical access to the device. However, in other embodiments, the consumer-managed records may be protected using one or more security arrangements including, but not limited to, password protection and encryption.

Figure 2:
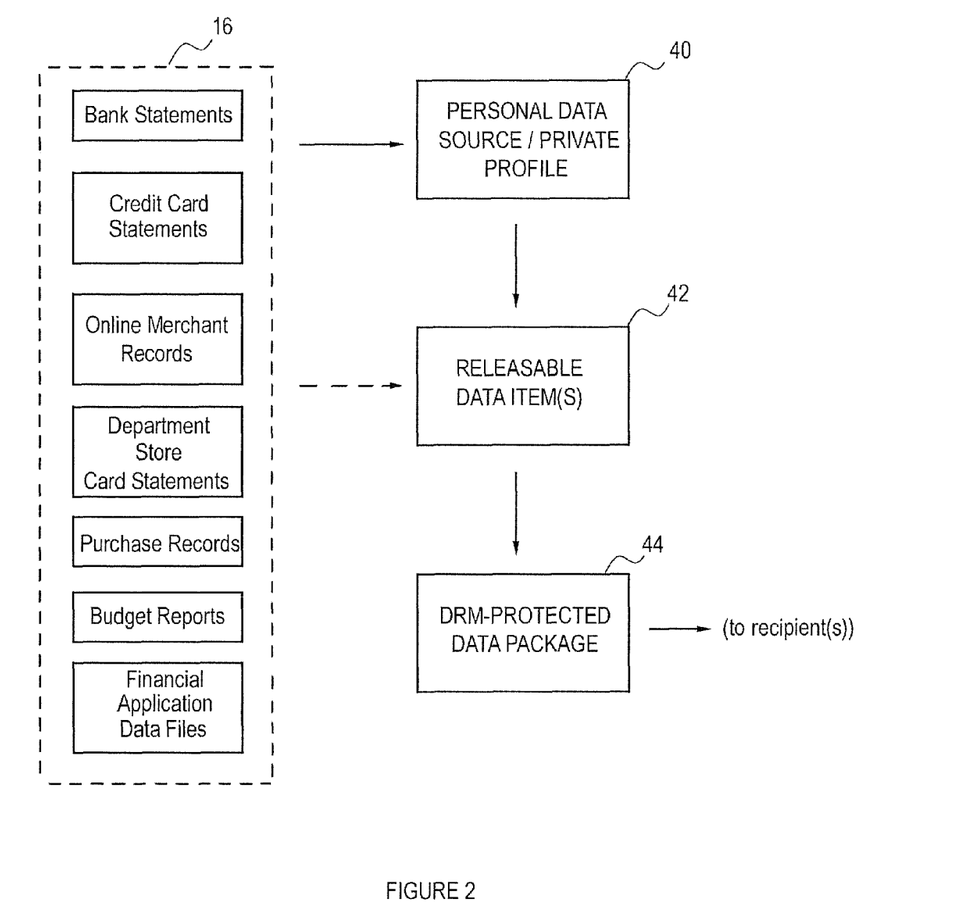
FIG. 2 is a diagram showing exemplary consumer-managed financial records and additional exemplary data items generated therefrom.

FIG. 2 is a block diagram showing exemplary consumer-managed financial records 16 in greater detail. In this example, records 16 include bank statements, credit card statements, online merchant records (such as recent purchases, "wish lists," and the like), department store card statements, purchase records (such as loyalty card statements indicating purchase of particular items), budget reports, and financial application data files. As noted above, in other embodiments, consumer-managed financial records may include utility and other service bills, for instance. Additional examples of records that may be included in consumer-managed financial records include income tax returns and documentation such as data files associated with tax management software. As another example, data from brokerage or trading accounts may also be included.

Although consumer managed financial records 16 may, in some cases, include some of the same information maintained by other entities, the consumer-managed financial records are under the control of the consumer. Additionally, the records may represent a collection of data from multiple sources, which may advantageously provide a one-stop source for data about the consumer. Furthermore, as noted above, the consumer-managed financial records may include the consumer's own annotations, additions, and derivations, such as budgeting and other reports derived from the financial data.

The advantages of a one-stop data source can be leveraged to the consumer's benefit in multiple ways. For example, in some embodiments, one or more personal profiling agents (PPA)s act on behalf of the consumer based on the consumer's preferences regarding data release and desired incentives (and any other guidelines specified by the consumer). However, since the consumer data can be stored in a data store associated with the consumer, privacy issues may be reduced since the consumer does not necessarily have to rely on a trusted third party to aggregate the consumer's data and respect the consumer's preferences regarding transfer, release, and maintenance of data.

FIG. 2 shows a personal data source/private profile 40 (referred to as private profile 40) which is derived from consumer-managed financial records 16. One or more private profiles 40 may be generated for each particular consumer. A "profile" as used herein is intended to refer to a set of data about the consumer that includes one or more financial data items describing one or more aspects of the consumer's finances.

In some embodiments, a profile may comprise the results of analysis of the consumer's data. For instance, the profile may list the consumer's budget for various spending categories. The budget may be derived directly from the consumer-managed financial records (such as budget reports) or indirectly through analysis of transactions and categorizations. For example, the consumer's bank records may list all purchases with the category "fuel." Based on the bank records, the consumer may have prepared a budget document detailing fuel expenditures from which the PPA determines the fuel budget. Alternatively or additionally, the PPA may determine the fuel budget by its own analysis of the bank records.

In other embodiments, private profile 40 may comprise at least some of the consumer's financial records, such as a list of transactions and/or set(s) of raw transaction data (or other statement data) meeting certain characteristics. In some embodiments, private profile 40 is not accessible by outside parties or is not provided to any outside parties in its entirety. Instead, private profile 40 may be maintained for use by the consumer's personal profiling agent in evaluating opportunities to release data and negotiating the terms of data release, for instance. This may be especially advantageous when private profile 40 includes information useful for internal use by the consumer but which could jeopardize the consumer's privacy if released. Private profile 40 may be used by other software agents and/or processes acting on behalf of the consumer, as well.

The consumer's PPA generates one or more sets of releasable data items 42. Items are determined to be releasable based on the consumer's preference regarding the circumstances and party (or parties) who are to receive the data in question. FIG. 2 shows that the releasable data items may be derived from private profile 40 and/or from consumer-managed financial records 16 directly. For instance, in some embodiments, transaction data may be included in private profile 40. Some releasable items 42 may be obtained by determining which portions of private profile 40 comprise items (such as transactions) allowed for the particular release that is under consideration.

In other embodiments, releasable data items 42 may comprise data items obtained directly from the consumer-managed financial records 16. For instance, the consumer's PPA may require a set of transaction records for release from the consumer's bank and/or credit card statements. If the transaction data is not in private profile 40 (or no private profile 40 has been generated), then the consumer's PPA may access one or more financial records to obtain the transactions.

In some embodiments, once one or more releasable data items 42 have been selected, the items are assembled into one or more DRM-protected data packages 44. Any suitable rights management scheme or schemes may be used. Generally speaking, regardless of how the system defines and manages rights, the consumer acts as the rights holder. For instance, the data items may be formatted using a license key scheme whereby the files are encrypted and sent to the receiving party or parties. In order to view the files, the recipient(s) must download a decryption key from a license key server. If the recipient(s) try to view the files outside the terms of the use specified by the consumer, the license key server does not provide the key.

In other embodiments, a separate DRM-protected package is not necessarily sent to the recipient(s). Instead, the recipient(s) are permitted controlled access to the consumer's files. For instance, releasable data items 42 may be encrypted and the recipient may be allowed to view items 42 over a secure channel. As another example, in some embodiments, release of information may comprise updating a publicly-available profile or other data source that is not solely within the consumer's control. For instance, the consumer may have granted access to a "semi-public" profile to a limited number of interested parties. Updated information may occasionally be released for use in keeping the profile(s) current. The various profiles may be protected by DRM or other security measures to control access and/or distribution of the data included in the profile.

Regardless of how the information reaches the recipient(s), the information may be transmitted/released at any time and on any schedule as agreed between the consumer and recipient(s), including upon request, at regular intervals, and at irregular intervals.

The level of rights and degree of access provided to a given recipient can be varied according to consumer preferences. For instance, data may be released subject to terms that prohibit transfer of the data, terms that provide for limited or otherwise controlled distribution of the data, and/or terms that provide for the data to expire after a given time period, for example. Depending on the data released and the recipient, it is conceivable for some items to be released subject to no restrictions. In such circumstances, then, no DRM protection would be necessary; however, a DRM or other distribution scheme that allowed for tracking of the extent of distribution may nonetheless be advantageous.

Figure 3:
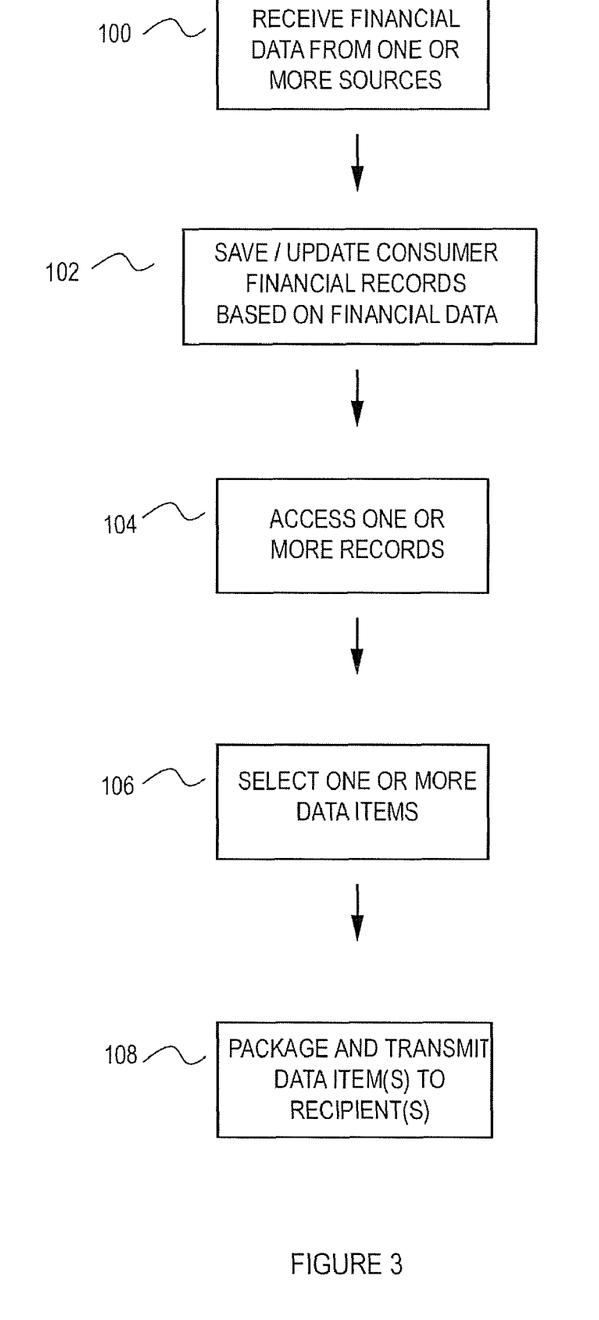
FIG. 3 is a flowchart illustrating steps in an exemplary embodiment of selecting and providing consumer data to one or more recipients.

FIG. 3 is a flowchart generally illustrating steps in an exemplary embodiment of selecting and providing consumer data to one or more recipients. At step 100, the consumer receives financial data from one or more sources. For example, the sources may include one or more banks, credit card issuers, online merchants, brick-and-mortar merchants, service providers (including electricity, water, gas, telephone, and television providers), other financial institutions such as brokerages, insurance companies, or any other entity that provides one or more statements detailing financial interaction(s) with the consumer. Although several of the examples relate to bills detailing situations in which the consumer transfers value to another entity, the financial data may represent transfers of value to the consumer as well, such as refunds, paychecks, sale proceeds, and dividends issued to the consumer. The transfers of value (both to and from the consumer) may comprise transfers of money, but may further include other measures of value such as store credits, rewards points, airline miles, and the like.

In some embodiments, the data is received as one or more structured documents such as electronic statements, bills, invoices, and the like. However, the statements and/or other records comprising the financial data may be provided in any suitable format. The consumer's profiling agent (and/or other software) may be configured to convert data between various forms as needed. For instance, conversions may be between file formats or may use optical character recognition (OCR), and the like.

At 102, one or more consumer-managed financial records are created, saved, and/or updated based on the financial data. For instance, if a consumer has not previously maintained any financial records, the consumer may use one or more suitable applications to create such records. For previously-existing records, the information contained therein can be updated. Additionally or alternatively, the consumer-managed records may comprise local copies of bills, statements, and other data received from outside sources.

The various combinations of types, arrangements, and other aspects of a consumer's financial (and/or other) record-keeping are beyond the scope of this specification and will vary based on the consumer's preferences, application(s) and data format(s) used and the particular data that is received. Therefore, it is intended that the examples of recordkeeping discussed in this document are for illustration only and are not intended to be limiting.

For instance, a consumer may receive one or more online bank statements and credit card bills in electronic form. The bills/statements may comprise structured documents including a list of transactions. For example, the bank statement may list various checks written by the consumer, automated teller machine (ATM) withdrawals, and account balances for one or several accounts. The consumer may manually and/or automatically import the financial data from the bills/statements into his or her financial records which are, in this example, an income/expense ledger such as can be maintained using Quicken or other suitable financial management programs. The consumer then categorizes the various transactions. For example, the consumer may designate budget categories such as food, rent, fuel, entertainment, and the like. In some embodiments, some or all of the transactions may be categorized or otherwise annotated automatically. Then, based on the ledger information, the consumer may generate one or more documents such as a report that breaks down spending by category. The report may be generated partially or wholly automatically by functionality (such as scripts, macros, or other components) included in the software. The consumer may prepare or access a budget forecast and generate a report to compare one month's projected budget to the actual expenditures for that month.

Steps 104, 106, and 108 represent actions that may be performed by one or more additional software applications or components that provide data sourcing functionality. The data sourcing software may comprise one or more separate applications, processes, scripts, system components, or other elements. However, the software may comprise a module or other component included in the financial management software application used by the consumer. For example, as noted above, the data sourcing software may comprise a personal profiling agent (PPA) or agents configured to evaluate available data and, if permissible, provide the data to one or more recipient parties.

The PPA (and/or other software) may act in response to a request for information about the consumer. For instance, the request may relate to one or more outside parties. For example, an advertiser may be interested in obtaining data about the consumer for use in profiling the consumer. Pursuant to one or more agreements between the consumer and the advertiser, the consumer's PPA may assemble and provide profiling data to the advertiser. Additionally or alternatively, the request may originate from other software (such as other software agents) operating for the benefit of the consumer. For example, the consumer's PPA may assemble and provide data for use by a software agent conducting an auction or negotiation for the release of data about the consumer to an outside party or parties in exchange for value. The PPA may then assemble and provide profiling data pursuant to the negotiated terms.

At 104, one or more of the consumer-managed financial records are accessed by the PPA. Then, at 106, the PPA proceeds to select one or more financial data items from the accessed record(s) for release. A financial data item may comprise any number of entries or elements of a consumer-managed financial record. For example, a financial data item can include individual transactions or groups of transactions included in the consumer's income/expense ledger. Other financial data items can include bill totals and other line items. Additional financial data items may include portions of the consumer's private profile or one or more public profiles. Still further financial data items can include data from consumer-generated information, such as the spending reports, budget projections, and other data generated by the consumer using the financial management software.

Access and/or selection is based on rules, preferences, and other parameters specified by the consumer. Generally speaking, the data sourcing software allows the consumer to designate which records and which data items within those records are allowed to be released and any additional terms, conditions, or other requirements that must be met before the information is released. Depending on the content and format of the record(s), a released data item may comprise an entire record in some embodiments.

The consumer may be able to designate certain categories of transactions and/or analysis that are cleared for release and other categories that are restricted from release. For instance, in embodiments relating to financial records, the consumer may designate that data items showing transactions related to "entertainment" spending are always available for potential release, while items related to "personal" spending are never allowed for release. Similarly, information included in the consumer-managed financial records such as the consumer's name, address, social security number, driver's license number, account numbers, and the like may be designated as never subject to release. The consumer may designate portions of his budget, such as projected spending for "groceries" as available for potential release, while other items, such as the amount of budget shortfall from a spending report, are restricted.

Records and items can be classified to any desired degree of granularity. For instance, some rules may apply to entire financial records, other rules to certain categories, and still further rules to individual transactions or line items. Similarly, the rules may be specified to any desired degree of complexity. For instance, the examples above used a binary "available"/"not available" designation. However, items may be designated as available but only after confirmation, or available only to certain requesting entities but not to others.

As mentioned above, the rules may provide for different levels of data access depending on the potential recipient of the data. For instance, the consumer may trust certain entities more than other entities. Accordingly, the more-trusted entities may be entitled to more data items and/or more detailed data for each item.

In some embodiments, the data comprising the consumer-managed data records is accessible based on access levels assigned to different potential recipients. For example, the consumer may designate records and/or data items with different levels of access that are required for release. In some embodiments, the consumer may further designate access levels for different entities. For example, the consumer may designate access levels for potential recipients of data for use in negotiations with the potential recipients. Additionally or alternatively, the consumer may associate levels for release subject to other terms, such as a desired incentive that must be received before the information is released. The desired incentive can vary depending upon the potential recipient.

Continuing in FIG. 3, at step 108, one or more selected data items are packaged and transmitted to one or more recipients. As will be discussed below, in some embodiments, records may be accessed and items selected based on terms agreed upon in negotiation process between the consumer and one or more potential recipients of data. In such embodiments, step 108 follows after a successful negotiation. However, in other embodiments, step 108 may represent ongoing activity in a pre-existing relationship between the consumer and the one or more recipients that receive the data. For example, as part of an agreement with a service provider, such as a cellular telephone carrier, the consumer may have agreed to periodically provide certain spending data. Thus, the one or more software agents acting on behalf of the consumer may periodically access records, select data items, and send the data to the cellular telephone carrier in accordance with the agreement.

In other embodiments, step 108 may represent the release of certain information to facilitate the negotiations. For instance, as will be discussed below, in some embodiments, selected items and/or portions of private profile 40 may be released to potential negotiation partners and/or during a negotiation. However, the information may be subject to restrictions to ensure that interested parties cannot engage in bad-faith negotiations solely to obtain preliminary information. For example, DRM restrictions may be used to prevent later use or transfer of the preliminarily-released information. In other embodiments, the consumer's PPA may have prepared and/or updated a public profile comprising information that is available to interested parties during negotiations.

Figure 4:
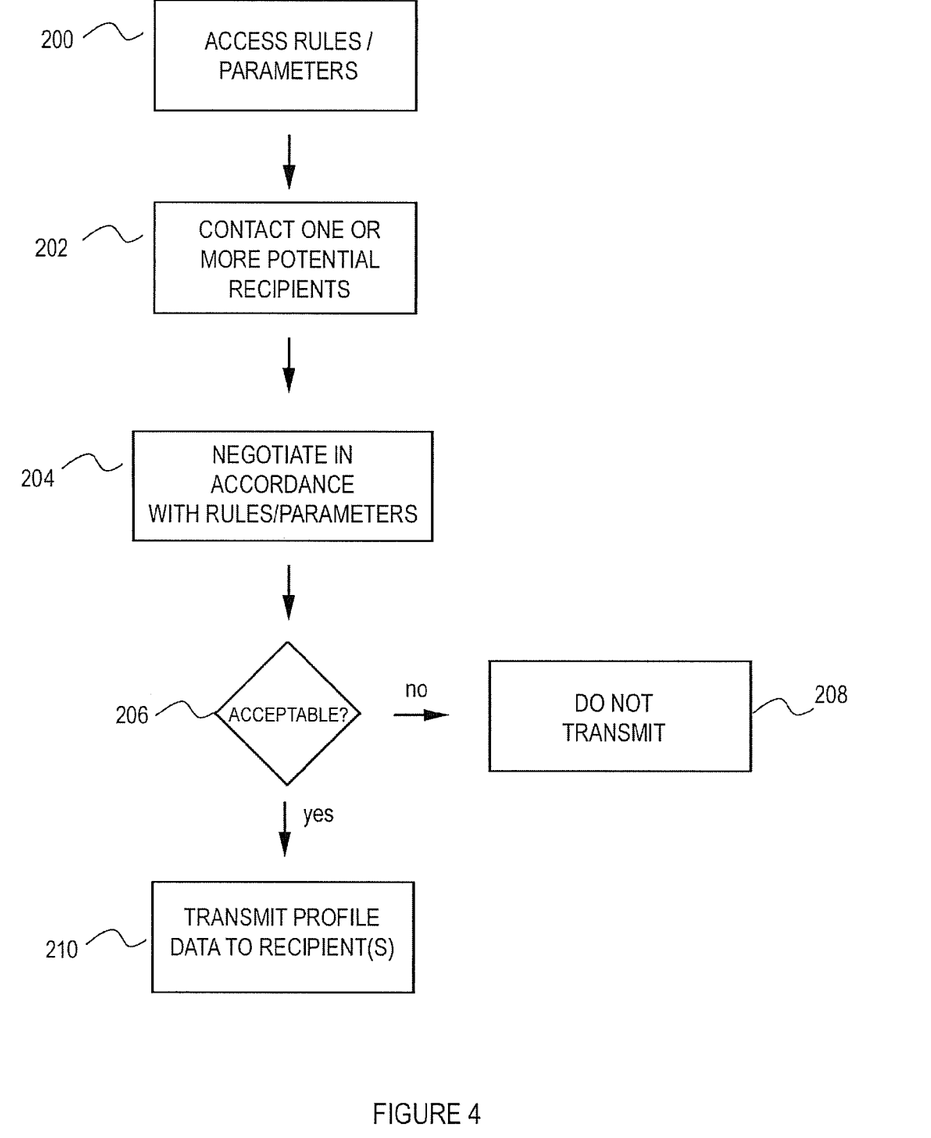
FIG. 4 is a flowchart illustrating steps in another exemplary embodiment for providing consumer profile data.

As was noted above, consumer profiling information may be transmitted to one or more interested recipients after a negotiation between the consumer (or a software agent acting on the consumer's behalf) and the recipient(s). FIG. 4 is a flowchart illustrating steps in another exemplary embodiment for providing consumer profile data that includes such a negotiation. The negotiation process in this example is carried out by the consumer's PPA. However, in some embodiments, one or more separate software negotiation agents may carry out the negotiation, with data selection and release handled by the PPA in accordance with agreed-upon terms reached during the negotiation.

At 200, rules and parameters specified by the consumer are accessed to determine which information is (potentially) available for release and the terms accompanying the release of the information. Based on the parameters provided by the consumer, at step 202, the PPA contacts one or more potential recipients. For example, interested data recipients may post announcements to one or more central locations or clearinghouses indicating interest in consumer data. The consumer's PPA may contact potential recipients based on the listings. Alternatively, the consumer's agent may advertise the availability of the consumer's data to one or more recipients who have provided information indicating potential interest or have purchased information in the past, or to publicly-available listings of consumers interested in releasing information. Thus, step 202 may represent solicitation of the consumer's agent by potential recipients.

In some embodiments, step 202 includes pre-screening by the consumer's agent and/or the potential recipients. For instance, the consumer may have designated a list of preferred and/or prohibited potential recipients used to include certain potential recipients in a negotiation and/or exclude certain other potential recipients. In some embodiments, as part of the pre-screening process, the consumer's PPA may access some of the consumer's information and/or release some information to potential purchasers.

For example, a listing may indicate that a gasoline company desires information about a consumer's fuel budget, but only for those consumers who spend over three hundred dollars a month on fuel. The consumer's PPA may consult financial records 16 and/or private profile 40 to determine if the consumer's information is acceptable before contacting the gasoline company or responding to overtures on behalf of the gasoline company. As part of the initial negotiation, the consumer's PPA may release the consumer's gasoline budget or an indication that the amount is over three hundred dollars a month (but not other information) to the gasoline company.

At step 204, the PPA negotiates with one or more potential recipients for the release of the consumer's information in exchange for value. In one embodiment, the PPA can conduct an auction on behalf of the consumer. As noted above, the auction/negotiation may be conducted by the PPA or by another software agent. For example, the software agent may announce the availability of the data and required minimum bids. Then, at step 204, the software agent may receive bids from one or more potential recipients interested in the information. The conduct, format, and outcome of the auction can be controlled based on rules and parameters provided by the consumer. For instance, in some embodiments, the consumer can provide additional rules for the auction process, such as acceptable minimum bids, duration of the auction, and any allowed variances from the desired incentives. For example, the consumer may provide parameters that allow for a reduction in the requested incentive amount if the auction continues for a predetermined time period, such as lowering a desired discount term from 10% to 8% if the auction proceeds for 10 minutes without any bids.

Alternatively, the negotiation at step 204 may take other forms. For example, the software agent may engage in one-to-one negotiations with each potential recipient (or software agents for each recipient). In such embodiments, the consumer's parameters can specify negotiation rules such as acceptable counter-offers. In other embodiments, the software agent acting on behalf of the consumer may participate in an auction held by one or more of the potential recipients. For example, the recipients may auction incentives in exchange for desired data.

In any event, step 206 represents a decision point. If the results of the negotiation are acceptable—that is, if the consumer's terms match those of the receiving party—financial data items are collected/assembled as necessary and transmitted to each party at step 210 in accordance with the terms agreed upon with each respective party. For instance, as noted above, the profiling data may be packaged using DRM to ensure that the consumer's usage terms are enforced. However, if no agreement is reached, then the process ends at 208 and no data is provided. In some embodiments, the consumer may be notified regarding the reason for the failure—for instance, the software agent may recommend adjustments to the terms that would be acceptable. Of course, when multiple potential recipients are involved, steps 206, 208, and 210 may proceed on a recipient-by-recipient basis (or, if potential recipients participate as a group, on a group-by-group basis).

In the example above, transmission of data is indicated as following a successful negotiation. The time interval between negotiation and transmission of data may comprise any length. For instance, in some embodiments, transmission of data follows immediately after negotiation. However, in other embodiments, an acceptable agreement can be reached in negotiation, but data is not transmitted until some time afterwards. In still further embodiments, data is transmitted multiple times after a successful negotiation. As was noted above, in some embodiments, rather than transmitting data or files, access to the data may be provided for the recipient to "pull" the data.

The negotiation process may result in creation of one or more contracts between the receiving party or parties and the consumer. Each contract may set forth the terms and conditions for release of information, including the amount of information, recency of the information, required level of detail, and logistical details on where the information should be provided. Additionally, the terms can specify the rights/ restrictions regarding use and/or transmittal of the data, as well as the various incentives to be provided to the consumer. The consumer's PPA may be configured to release information in accordance with the terms of the agreed-upon contract(s).

Figure 5:
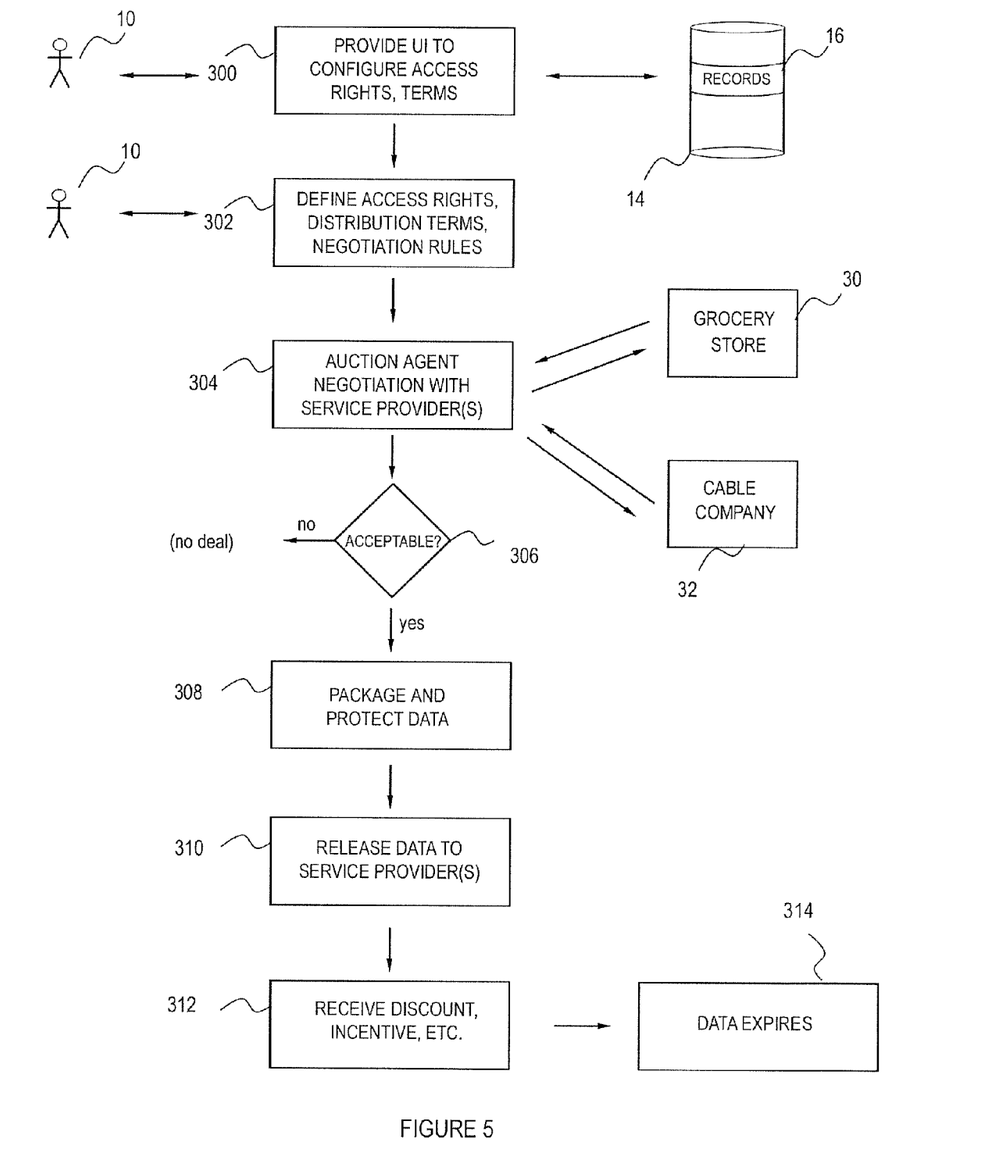
FIG. 5 is a flowchart showing exemplary steps in another exemplary embodiment for providing consumer profile data.

FIG. 5 is a flowchart showing exemplary steps in another exemplary embodiment for providing consumer profile data. In this example, consumer 10 will designate various items for potential release and an auction will be conducted on behalf of consumer 10 by a software agent. First, at step 300, consumer 10 is provided with a user interface (UI) for configuring access rights and terms for release of various portions of the consumer's financial records 16. This UI may be presented to consumer 10 while managing various financial records using computing device 12, for instance. For example, the consumer may designate various financial data items by access level and further indicate desired incentives for the release of the information as set forth in Table 1 below:

TABLE 1

Exemplary Release Parameters

| Item Designation | Level | Desired Incentive | Other rules |
|---|---|---|---|
| Entertainment expenses for last month | 1 | 10% discount offer | expires 10 days; no third party transfer |
| Entertainment budget for next month | 2 | 15% discount offer | expires 10 days; no third party transfer |
| Grocery budget itemized transactions | 2 | $0.001 USD per data item | expires 5 days; no third party transfer |

At step 302, items may be designated in any suitable manner. For example, the access level for each item may be specified by the consumer using a computing device as the consumer maintains, augments, and assembles financial records. For instance, after downloading recent bank and/or credit card transactions, as noted above, the consumer may tag transactions with different budgeting categories. The data sourcing software may include a module configured to operate with the consumer's financial management software application(s) so that the consumer can designate rights levels, as well. For instance, the consumer may mark certain categories and/or data items with codes indicating the required access level.

At step 302, the consumer also specifies distribution terms and negotiation rules for use in negotiating release of data to one or more interested recipients. For example, the data sourcing software may provide the consumer with a series of selections whereby the consumer can input rules for conducting an auction and restrictions on the data. In this example, the consumer has indicated a willingness to provide data indicating entertainment expenses for the last month in exchange for a 10% discount offer from the receiving party (or parties). An additional rule is specified that the data "expires" in 10 days and transfer to third parties is prohibited. For example, if the consumer wishes to sell data to multiple parties, prohibition of third party transfer will advantageously avoid data sharing amongst recipients in addition to maintaining privacy. In this example, the consumer has designated that next month's projected entertainment budget is more valuable inasmuch as it is available in exchange for a 15% discount and is subject to the same restrictions regarding time and third-party transfer. In this example, the consumer has further indicated that data from the consumer's grocery budget is available in exchange for one cent per data item.

As mentioned earlier in this specification, multiple computing devices may be involved in sourcing data. For example, consumer 10 may manage financial records 18 and specify distribution and negotiation rules using computer 12. However, distribution and negotiation rules may be specified in a different processing environment or environments and/or at a different time from when the records are managed. For instance, the consumer may have one or more other computing devices that can access the consumer-managed financial records and provide the consumer with one or more UIs for configuring distribution rules, negotiation rules, and other release preferences.

For example, the consumer may have a set-top box (STB) providing interactive digital television and/or recording capabilities. The STB can be configured by data sourcing software components to access the consumer-managed financial records and provide selection menus for the consumer to oversee the distribution of his financial information. For example, the STB may be connected to a network whereby the STB can access data store 14. Alternatively, the STB may include a port where consumer 10 can connect a portable storage device comprising all or some of the records from data source 14. For instance, in some embodiments, the consumer's entire set of financial records 16 may be mirrored onto a portable device. In other embodiments, only a subset of the records 16 may be included. In still further embodiments, the consumer's private profile 20 is included on the portable storage device.

At step 304, one or more software agents acting on behalf of consumer 10 conduct an auction of the consumer's data items. A separate auction agent may be used, or the consumer's personal profiling agent may include auctioning capabilities. In this example, grocery store 30 and cable company 32 are shown as participants in the auction. For example, the software agent may announce the potential availability of items from consumer 10's entertainment and grocery budget. The announcement may be sent to individual entities such as grocery store 30 and cable company 32 or may be made as part of an open market or other forum. The auction agent may then arrange an auction with acceptable interested parties.

In this example, grocery store 30 and cable company 32 are participants. For example, cable company 32 may make regular offers for discounts to consumers in exchange for profiling information, while grocery store 30 may not have loyalty card or other purchase information regarding the consumer. Other parties may have been interested but were screened out. For instance, consumer 10 may have provided a rule that no data is to be released to online merchant 24. Therefore, even if online merchant 24 wishes to participate in the auction, it may be barred from participation or its bids disregarded. However, the particular motivation(s) of the various parties are for purposes of example only and are not intended to be limiting.

The particular implementation of the auction agent(s) is not discussed in the present specification. The auction agent(s) may be configured to perform any suitable mode or type of auction and may be implemented in any suitable manner. For instance, in the traditional auction type, the highest bidder for any particular offering wins. As an example, grocery store 30 and cable company 32 may attempt to outbid one another to obtain certain data items. Since the data items in this example are non-transferable, the items may be auctioned multiple times.

For purposes of this example, assume that only grocery store 30 bid on the offered itemized grocery transactions, while cable company 32 won the auctions for both entertainment budget offerings by providing a 17% discount for each entertainment offering, and so at step 306, the terms of the respective negotiations are deemed acceptable.

At step 308, the relevant data items are selected and packaged for delivery to the winning recipients. For instance, the consumer's PPA can access the consumer's financial records and select items designated as part of the entertainment budget for the next month and items designated as part of the current month's entertainment expenses. Each set of entertainment budget items may then be packaged using any suitable DRM technique for delivery to cable company 32. Similarly, the agent can access the consumer's financial records and select grocery purchase transactions and assemble a DRM package for delivery to grocery store 30. As was noted above, any suitable delivery method or methods may be used and/or controlled access may be substituted in lieu of delivery.

Also as was noted above, any suitable DRM technique or techniques may be used. For example, profiling data may be encrypted in a DRM package with a license key URL that refers to a resource under the consumer's control. The consumer could then provide the license key only to the appropriate recipient during the time period that access to the data is allowed (e.g., for the entertainment budget items, only during the first ten days after sale). However, the particular implementation of DRM is not intended to be limiting—for example, DRM compliance could be handled by one or more third parties acting on behalf of the consumer. For instance, the consumer may provide the license terms to the third party service(s) that perform the encryption of the data and/or handle the provision of the license key.

At step 310, the packaged consumer profiling data is released to the appropriate outside parties, in this example, grocery store 30 and cable company 32. In some embodiments, one or more packages may be transmitted to each entity. In other embodiments, each entity is granted access to the packages for retrieval. For example, the consumer may maintain a server that permits access to the packages. At step 312, the consumer receives the agreed-upon incentives. In some embodiments, if the receiving party does not comply with the terms of the negotiation, the party's access rights may be revoked. However, in other embodiments, steps 312 and 310 may be reversed—that is, the consumer may require up-front payment of part or all of an incentive prior to releasing data. In other embodiments, a third party may be involved to provide escrow services. Finally, at 314, in this example, the transferred data eventually expires. For instance, after five days, grocery store 30 will no longer have access to the grocery transaction data, and after ten days, cable company 32 will no longer have access to the entertainment budget items.

The examples discussed herein have generally referred to a single consumer's records and actions taken regarding those records. However, the presently-disclosed subject matter may be used for any type or number of consumers, whether individuals or groups, male or female, and regardless of age. The profiling data for multiple consumers may be handled by individual profiles and consumer PPAs, or the system may be configured to treat certain individuals as a group for certain tasks. As an example, several members of a household may have individual profiles and individually-managed financial records, but for purposes of data sale/distribution, the household's collective data may be sold en masse. Additionally, as noted above, several examples herein related to consumer financial data, consumer-managed financial records, and financial data items such as transaction records. However, it should be appreciated that the principles and teachings discussed herein are applicable to other types of data.

It is appreciated by persons skilled in the art that what has been particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed:

1. A computing device comprising:
   memory; and
   a processor operatively associated with the memory and configured to:
   obtain data associated with a consumer, the data including financial records associated with the consumer;
   obtain rules from the consumer, wherein the rules specify:
   an incentive to be received by the consumer in exchange for releasing the data to a service provider; and
   the release of the data;
   conduct an auction on behalf of the consumer with a plurality of service providers using the incentive, wherein the incentive is based on a service provided by ones of the plurality of service providers to the consumer in exchange for receiving the data;
   receive bids from the ones of the plurality of service providers that will provide the service based on the incentive;
   select a service provider based on the received bids from the ones of the plurality of service providers;
   package the data using a digital rights management (DRM) technique in accordance with the rules specifying the release of the data;
   release the packaged data to the service provider;
   receive the incentive from the service provider; and
   provide the incentive to the consumer.

2. The computing device as set forth in claim 1, wherein the rules specify one or more data items as prohibited from release to the service provider.

3. The computing device as set forth in claim 1, wherein the data further includes a transaction record.

4. A computer program product, comprising a non-transitory computer-readable medium having a computer-readable program code embodied therein, the computer-readable program code adapted to be executed on a processor to implement a method of providing information about a consumer comprising:
   obtaining consumer data, the consumer data including financial records associated with the consumer;
   obtaining rules from the consumer, wherein the rules specify:
   an incentive to be received by the consumer in exchange for releasing the data to a service provider; and
   the release of the data;
   conducting an auction on behalf of the consumer with a plurality of service providers using the incentive, wherein the incentive is based on a service provided by ones of the plurality of service providers to the consumer in exchange for receiving the data;

receiving bids from the ones of the plurality of service providers that will provide the service based on the incentive;
selecting a service provider based on the received bids from the ones of the plurality of service providers;
packaging the data using a digital rights management (DRM) technique in accordance with the rules specifying the release of the data;
releasing the packaged data to the service provider;
receiving the incentive from the service provider; and
providing the incentive to the consumer.

5. The computer program product as set forth in claim 4, wherein the rules designate one or more data items as prohibited from release to the service provider.

6. The computer program product as set forth in claim 4, further comprising preparing at least one profile of the consumer based on data from at least one consumer-managed data record.

7. The computer program product as set forth in claim 4, wherein the data further includes a transaction record.

* * * * *